(12) United States Patent
Hallbauer et al.

(10) Patent No.: US 6,992,685 B2
(45) Date of Patent: Jan. 31, 2006

(54) MEASURING GEOMETRY IN A COMPUTER-IMPLEMENTED DRAWING TOOL

(75) Inventors: Damian M. Hallbauer, San Francisco, CA (US); Eileen M. Sinnott, San Francisco, CA (US); Colleen O'Rourke, San Rafael, CA (US)

(73) Assignee: Autodesk, Inc., San Rafael, CA (US)

( * ) Notice: Subject to any disclaimer, the term of this patent is extended or adjusted under 35 U.S.C. 154(b) by 552 days.

(21) Appl. No.: 09/792,602

(22) Filed: Feb. 23, 2001

(65) Prior Publication Data

US 2002/0158886 A1    Oct. 31, 2002

(51) Int. Cl.
*G09G 5/00*    (2006.01)

(52) U.S. Cl. ...................... 345/619; 345/621; 345/622; 345/661

(58) Field of Classification Search ................ 345/619, 345/661, 964, 621, 622; 707/1, 2, 3, 4, 5
See application file for complete search history.

(56) References Cited

U.S. PATENT DOCUMENTS 5,297,241 A  *  3/1994  Hirr, Jr. et al. ............. 345/427
6,629,093 B1 *  9/2003  Davis et al. .................. 707/3

* cited by examiner

*Primary Examiner*—Matthew C. Bella
*Assistant Examiner*—Tam Tran
(74) *Attorney, Agent, or Firm*—Gates & Cooper LLP

(57) ABSTRACT

A computer-implemented drawing tool provides a number of different measurement functions in the context of reviewing and marking up drawings. Drawings may be annotated by the drawing tool using a Measure object, wherein the Measure object is placed proximate to one of the other objects in the drawing and then queries the object for one or more measurement values stored therein. These measurement values may comprise a distance, a multi-distance (e.g., path of travel), or area. The Measure object displays the measurement values queried from the object when it is displayed on a monitor of a computer by the drawing tool.

40 Claims, 12 Drawing Sheets

MEASURING GEOMETRY IN A COMPUTER-IMPLEMENTED DRAWING TOOL

CROSS-REFERENCE TO RELATED APPLICATIONS

This application is related to the following co-pending and commonly-assigned patent applications, all of which are incorporated by reference herein:

Application Ser. No. 09/094,618, filed 15 Jun. 1998, by Chase et al., entitled INTERACTIVE, DYNAMIC, AUTOMATIC DIMENSION ARRANGEMENT GENERATOR FOR COMPUTER-AIDED DRAFTING PROGRAMS;

Application Ser. No. 09/088,116, filed 1 Jun. 1998, by Felser et al., entitled POSITIONING AND ALIGNMENT AIDS FOR SHAPE OBJECTS HAVING AUTHORABLE BEHAVIORS AND APPEARANCES, Application Ser. No. 09/488,308, filed 20 Jan. 2000, by Felser et al., entitled SHAPE OBJECTS HAVING AUTHORABLE BEHAVIORS AND APPEARANCES;

Application Ser. No. 09/092,383, filed 5 Jun. 1998, by Felser et al., entitled SHAPE OBJECTS HAVING AUTHORABLE BEHAVIORS AND APPEARANCES, now U.S. Pat. No. 6,064,386, issued 16 May 2000;

Application Ser. No. 09/450,207, filed 29 Nov. 1999, by Arsenault et al., entitled FRAMEWORK FOR OBJECTS HAVING AUTHORABLE BEHAVIORS AND APPEARANCES, Application Ser. No. 09/169,599, filed 9 Oct. 1998, by Felser et al., entitled FRAMEWORK FOR OBJECTS HAVING AUTHORABLE BEHAVIORS AND APPEARANCES, now U.S. Pat. No. 6,025,849, issued 15 Feb. 2000, Application Ser. No. 09/428,595, filed 27 Oct. 1999, by Arsenault et al., entitled INFRASTRUCTURE FOR SHAPE EVENT HANDLERS, Application Ser. No. 09/302,146, filed 29 Apr. 1999, by Awe et al., entitled DISPLAY REPRESENTATIONS AND STREAMS FOR OBJECTS HAVING AUTHORABLE AND DYNAMIC BEHAVIORS AND APPEARANCES, Application Ser. No. 09/191,919, filed 13 Nov. 1998, by Baumann, entitled METHOD FOR DIMENSIONING GRAPHICAL OBJECTS DISPLAYED ON A DISPLAY DEVICE, Application Ser. No. 09/501,474, filed 9 Feb. 2000, by Abeyta et al., entitled INTELLIGENT DRAWING REDLINING AND COMMENTING FEATURE, which claims priority from Application Ser. No. 60/119,695, filed 11 Feb. 1999, by Abeyta et al., entitled INTELLIGENT DRAWING REDLINING AND COMMENTING FEATURE, and Application Ser. No. 09/527,104, filed 16 Mar. 2000, by Demopoulus et al., entitled REDLINE EXTENSIBLE MARKUP LANGUAGE (XML) SCHEMA.

BACKGROUND OF THE INVENTION

1. Field of the Invention

The present invention relates generally to graphics processing software, and in particular, to a method, apparatus, and article of manufacture for measuring geometry in a computer-implemented drawing tool.

2. Description of the Related Art

Computer graphics programs, such as the Volo View® program, sold by Autodesk, Inc., permit users to redline or markup drawings. The redlines/markups may be stored in a file separate from the original drawing. Further, the redlines/markups may be transmitted across the Internet and viewed/utilized by other users.

However, measuring objects in the prior art remains fairly primitive. Measuring is the process of obtaining real-world dimensions and measurements from a drawing. On paper drawings, measuring is done with tools such as calipers and scales, which help those who read drawings to convert the drawing's units to real-world units. With electronic drawings, computer-implemented measuring tools are required.

The prior art does not provide adequate measuring tools for use in redline/markup drawing tools. Consequently, there is a need in the art for a consistent set of functions and objects that provide the required measuring tools. The present invention meets these needs by giving users the ability to store measurements as redline objects in a marked up drawing. Moreover, these object-based redline measurements maintain the same standard information maintained by other redline markups.

The benefits of measuring using the present invention accrue to those who streamline their design process to take advantage of electronic viewing and reviewing.

- Design teams that use electronic measuring generate less paper, and therefore have to keep track of fewer paper documents.
- Electronic measuring allows much more accurate and efficient scaling of drawings without requiring users to plot-to-scale before such measuring.
- Electronic measuring combined with redlining and networking allows more people to simultaneously provide feedback on marked up drawings.

SUMMARY OF THE INVENTION

To address the requirements described above, the present invention discloses a computer-implemented drawing tool that provides a number of different measurement functions in the context of reviewing and marking up drawings. Drawings may be annotated by the drawing tool using a Measure object, wherein the Measure object is placed proximate to one of the other objects in the drawing and then it queries the object for one or more measurement values stored therein. These measurement values may comprise a distance, a multi-distance (e.g., path of travel), or area. The Measure object displays the measurement values queried from the object when it is displayed on a monitor of a computer by the drawing tool.

BRIEF DESCRIPTION OF THE DRAWINGS

Referring now to the drawings in which like reference numbers represent corresponding parts throughout.

DETAILED DESCRIPTION OF THE INVENTION

Figure 1:
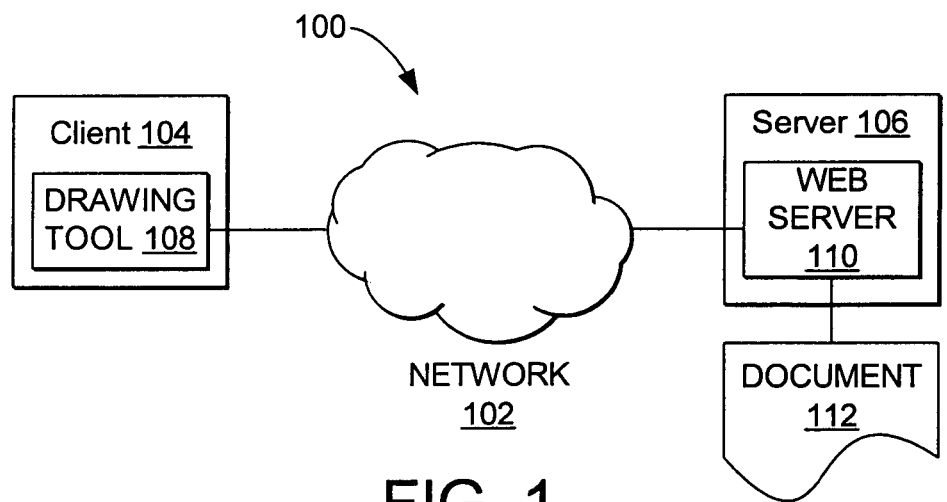
FIG. 1 schematically illustrates a hardware and software environment in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention comprises a computer-implemented, high-performance, web-enabled, review, markup, measure, plotting, and drawing tool for computerized drawings, especially those that include engineering data, such as AutoCAD® DWG™, DXF™, DWF™, and raster image format files. Specifically, the present invention comprises a number of measurement functions for use in the drawing tool.

In a preferred embodiment, these functions may be embodied in the Volo View® product sold by the assignee of the present invention, Autodesk, Inc., although those skilled in the art will recognize that they could be implemented in many other products as well. Volo View is intended for use by collaborative groups, wherein the drawings are authored in the AutoCAD product and then individual users can use Volo View to review and mark up the drawings, without altering the drawings themselves.

The Volo View product is further described in some of the co-pending and commonly-assigned applications cited in the section above entitled "Cross-Reference to Related Applications", which are incorporated by reference herein.

The measurement functions of the present invention are implemented using Measure objects. Measure objects query other objects for distances, areas, and paths of travel. Moreover, measure objects can snap to other objects.

In the preferred embodiment, Measure objects are using ActiveShapes® technology. The ActiveShapes® technology is further described in some of the co-pending and commonly-assigned applications cited in the section above entitled "Cross-Reference to Related Applications", which are incorporated by reference herein.

Hardware and Software Environment

FIG. 1 schematically illustrates a hardware and software environment in accordance with one or more embodiments of the invention, and more particularly, illustrates a typical distributed computer system 100 using a network 102 to connect client computers 104 to server computers 106. A typical combination of resources may include a network 102 comprising the Internet, LANs, WANs, or the like, clients 104 that are personal computers or workstations, and servers 106 that are personal computers, workstations, minicomputers, or mainframes.

In accordance with one or more embodiments of the invention, the network 102 connects client computers 104 executing a drawing tool 108 to server computers 106 executing Web servers 110. The drawing tool 108 may interact with the Web server 110 in order to obtain and download a document 112 containing one or more drawings for subsequent viewing and printing. Moreover, with the drawing tool 108, the user can annotate or mark up the drawings in the document 112. In the preferred embodiment, these annotations or markups include Measure objects, such as "Markup Distance", "Markup Multi-Distance", "Markup Area", which are dimension measurements, and "Measure Distance, "Measure Multi-Distance", and "Measure Area", which are temporary measurements.

Generally, these Measure objects comprise logic and/or data that is embodied in or retrievable from device, medium, signal, or carrier, e.g., a data storage device, a data communications device, a remote computer or device coupled to the computer across a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions ate performed thereby. Specifically, those skilled in the art will recognize that the present invention may be applied to any database, associated database management system, or peripheral device.

Redline Document

Figure 2:
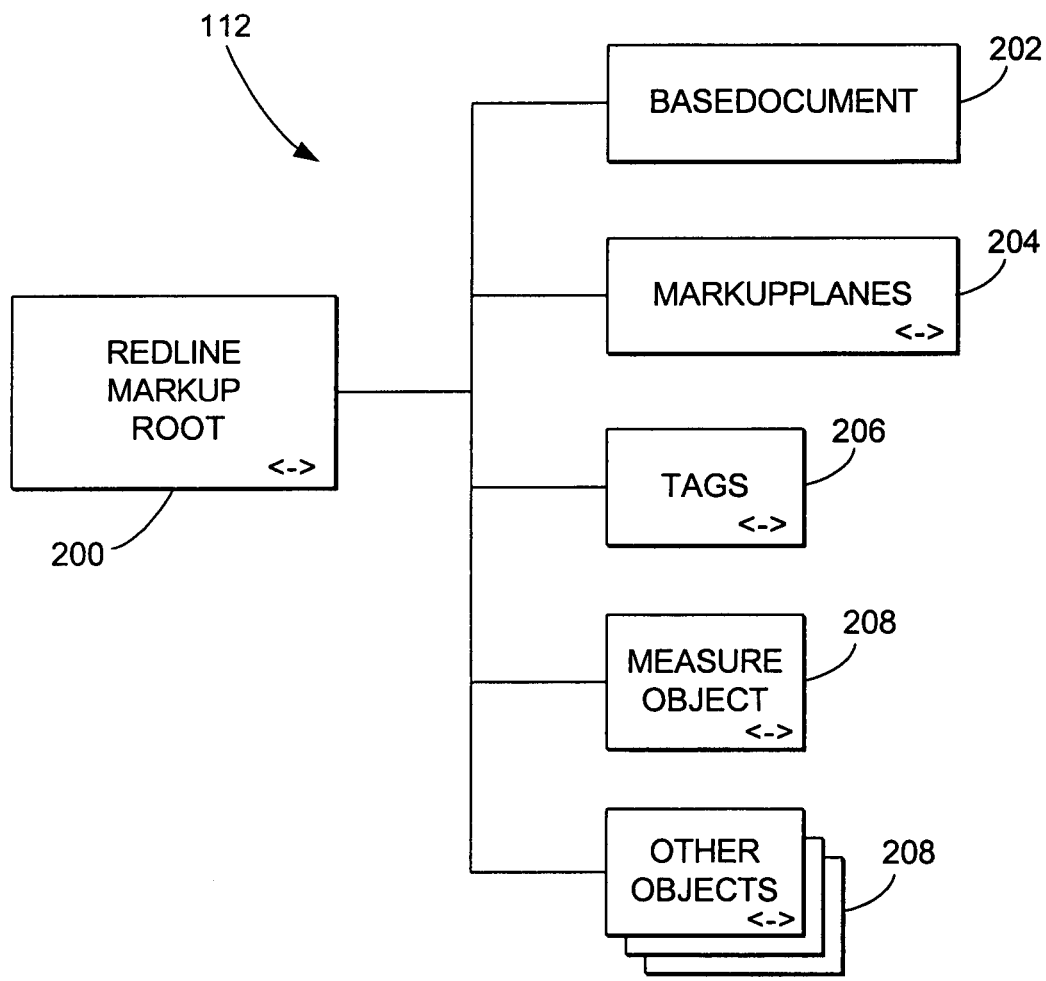
FIG. 2 is a hierarchical graph that illustrates the structure of an annotated or markup drawing that is created by a drawing tool and stored in a document according to the preferred embodiment of the present invention.

FIG. 2 is a hierarchical graph that illustrates the structure of an annotated or markup drawing that is created by the drawing tool 108 and stored in the document 112 according to the preferred embodiment of the present invention. In the preferred embodiment, the markup drawing is known as a Redline XML drawing, and is formatted according to a related Redline XML schema.

More information on the structure of the Redline XML drawing, and its related Redline XML schema, can be found in some of the co-pending and commonly-assigned applications cited in the section above entitled "Cross-Reference to Related Applications", which are incorporated by reference herein.

In FIG. 2, a Redline Markup Root 200 comprises a root element of the markup drawing, and contains sub-elements comprising a BaseDocument 202, MarkupPlanes 204, Tags 206, and Objects 208. Elements containing the notation "<->" (e.g., RedlineMarkup 200, MarkupPlanes 204, Tags 206, and Objects 208,) may be further expanded and contain children elements. Each of the elements 202–208 is optional.

The BaseDocument element 202 references or links to a base document that is being marked up (the base document itself is not altered). The attributes of the BaseDocument element 206 provide the information needed to recognize and parse the elements of an XML schema used to represent the type of base document being marked up.

The MarkupPlanes element 204 represent the different markup planes defined in a markup drawing. Objects 208 can be assigned to exactly one of multiple markup planes in a markup drawing. Objects 208 assigned to a markup plane may inherit their style attributes from the assigned markup plane, if the object 208 does not specifically identify its own style attribute values. Markup planes can be used to collect different markup authors' redline objects.

The Tags element 206 contains information on the status of its parent element (in this case, the entire markup drawing). The Tags element 206 is a collection of Tag elements that may contain information about when the markup drawing was last accessed and what users accessed it.

When a base document 202 is redlined or marked up, the markups or redlines may be represented as Objects 208, which include (but are not limited to) the following elements: Line, Polyline, Arc, Spline, Sketch, Rectangle, Circle, Ellipse, Cloud, Text, Note, and Callout, each of which may contain other elements and attributes.

In the preferred embodiment of the present invention, the group of Objects 208 is expanded to include new objects, known as Measure objects 208. As noted above, these Measure objects 208 include dimension measurement objects 208 ("Markup Distance", "Markup Multi-Distance", and "Markup Area") and temporary measurement objects 208 ("Measure Distance, "Measure Multi-Distance", and "Measure Area"). The use of the different dimension and temporary measurement objects 208, and the functions they embody, are described in more detail below.

Drawing Tool

Figure 3:
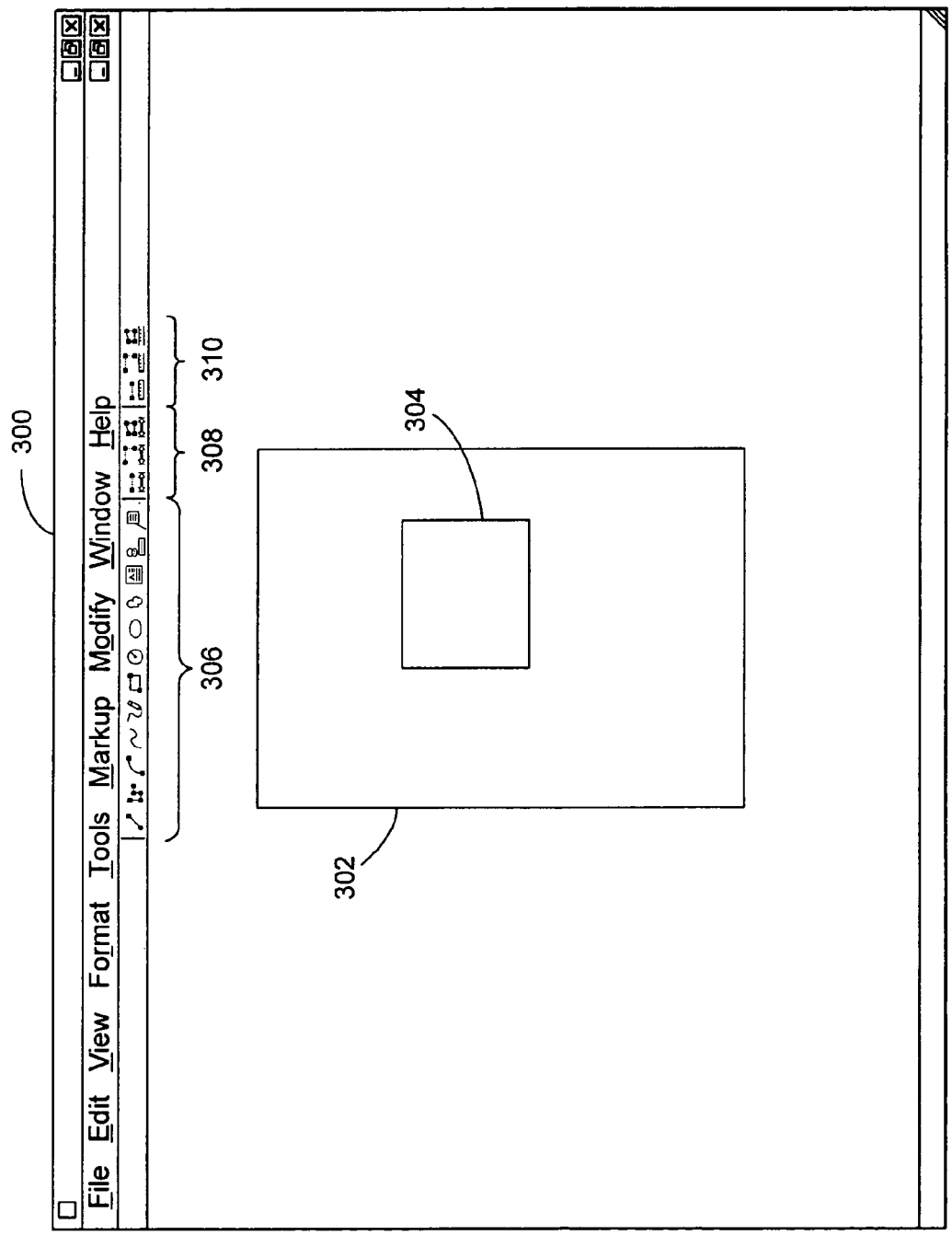
FIGS. 3–12 are illustrations of a graphical user interface (GUI) of the drawing tool according to the preferred embodiment of the present invention.

FIG. 3 is an illustration of the graphical user interface (GUI) 300 of the drawing tool 108 according to the preferred embodiment of the present invention. The GUI 300 comprises a window that is displayed on a monitor of the client computer 104.

When the user opens a base drawing using the drawing tool 108, a markup drawing is created and associated with the base drawing. In the example of FIG. 3, the GUI 300 displays a markup drawing 302 that contains a square object 304. The user cannot change the base drawing, only the markup drawing 302. However, because the markup drawing 302 only references the base drawing via the BaseDocument element 202, the drawing tool 108 must have access to the base drawing to correctly display the markup drawing 302.

Using the drawing tool 108, the user may annotate areas of the markup drawing 302, e.g., circling problem areas, adding notes, adding measurements, etc. The GUI 300 displays a number of different menus and toolbars for this purpose.

Three toolbars 306, 308, and 310 represent markup objects 208. The Markup toolbar 306 includes icons representing, from left to right, the following markup elements: Line, Polyline, Arc, Spline, Sketch, Rectangle, Circle, Ellipse, Cloud, Text, Note, and Callout. The Measure Markup toolbar 308 includes icons representing, from left to right, the following markup elements: Markup Distance, Markup Multi-Distance, and Markup Area. The Measure toolbar 310 includes icons representing, from left to right, the following markup elements: Measure Distance, Measure Multi-Distance, and Measure Area. The use of the different icons, and the functions they embody, are described in more detail below.

Adding Measurements

There are two reasons to add measurements to a markup drawing 302:

The user is taking measurements so that the user can add other markups. These are called temporary measurements, which are described further below.

The user is adding measurements as a markup. These are called dimension measurements, which are described further below.

Using Precision Markup Tools

Precision markup tools in the drawing tool 108 help the user create markups with precision. These tools include Rulers (shown in FIG. 4), AutoSnap (shown in FIG. 5), and Property Window (shown in FIG. 6), wherein the Rulers can be used to help the user make exact measurements, whether temporary or dimension, the AutoSnap can make the cursor snap to endpoints, midpoints, centers, and the like, and the Property Window helps the user to keep measurements exact.

Figure 4:
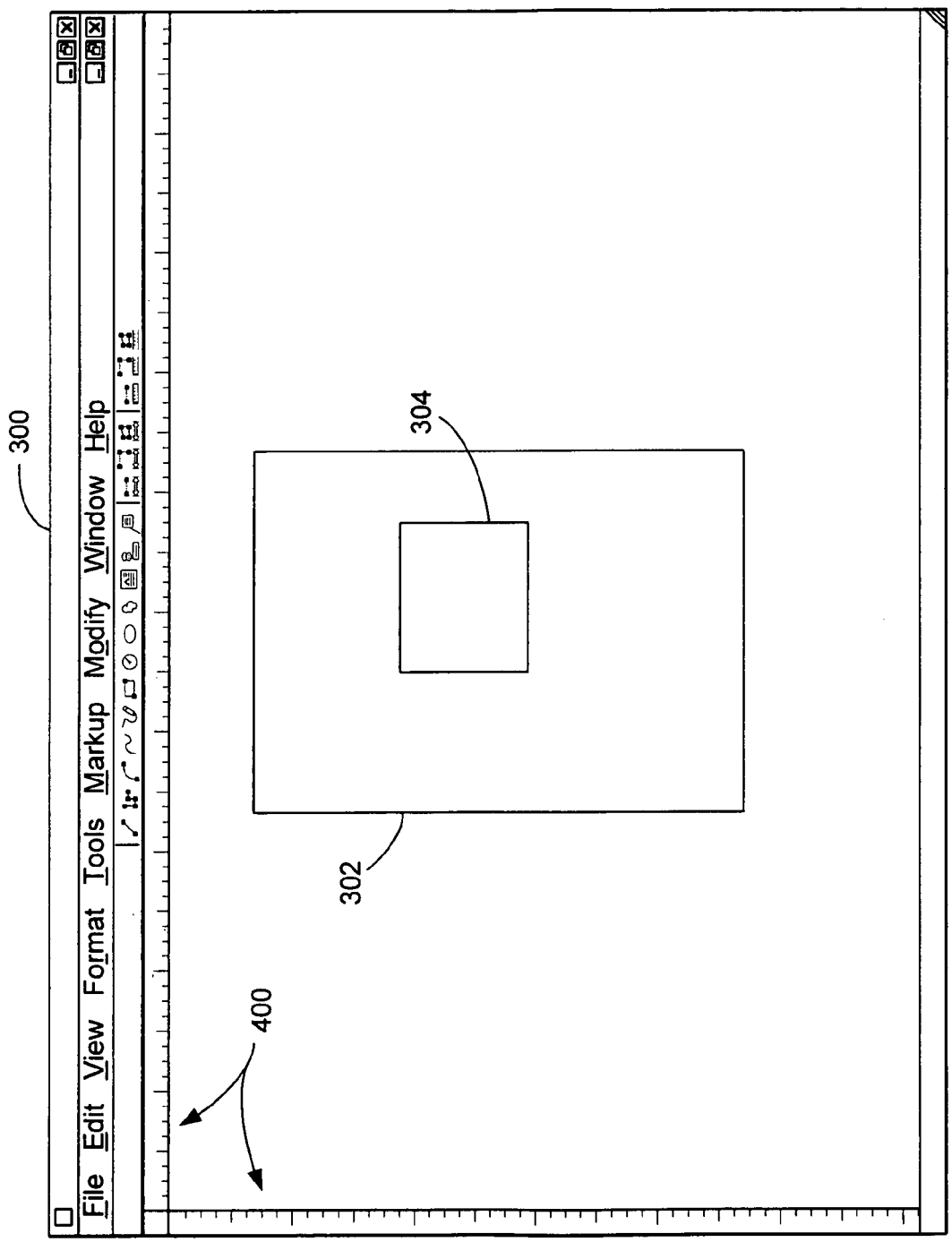

Referring to FIG. 4, Rulers 400 display at the top and left sides of the drawing window. They show measurements based on the current units and drawing scale. For example, units can be set to feet and inches values, wherein a drawing scale may comprise 0'–1"=10'–0". Rulers 400 also display the position of the cursor, which helps the user to select an exact point on the X and Y axes. Rulers 400 can help the user move, rotate, scale, or mirror a markup precisely. For example, if the user turns on Center snap, the user can select the center of a piece of text and place it exactly at a point the user see marked with solid lines on the X and Y axes in the rulers. Rulers 400 are turned on and off by selecting Rulers on the View menu.

Figure 5:
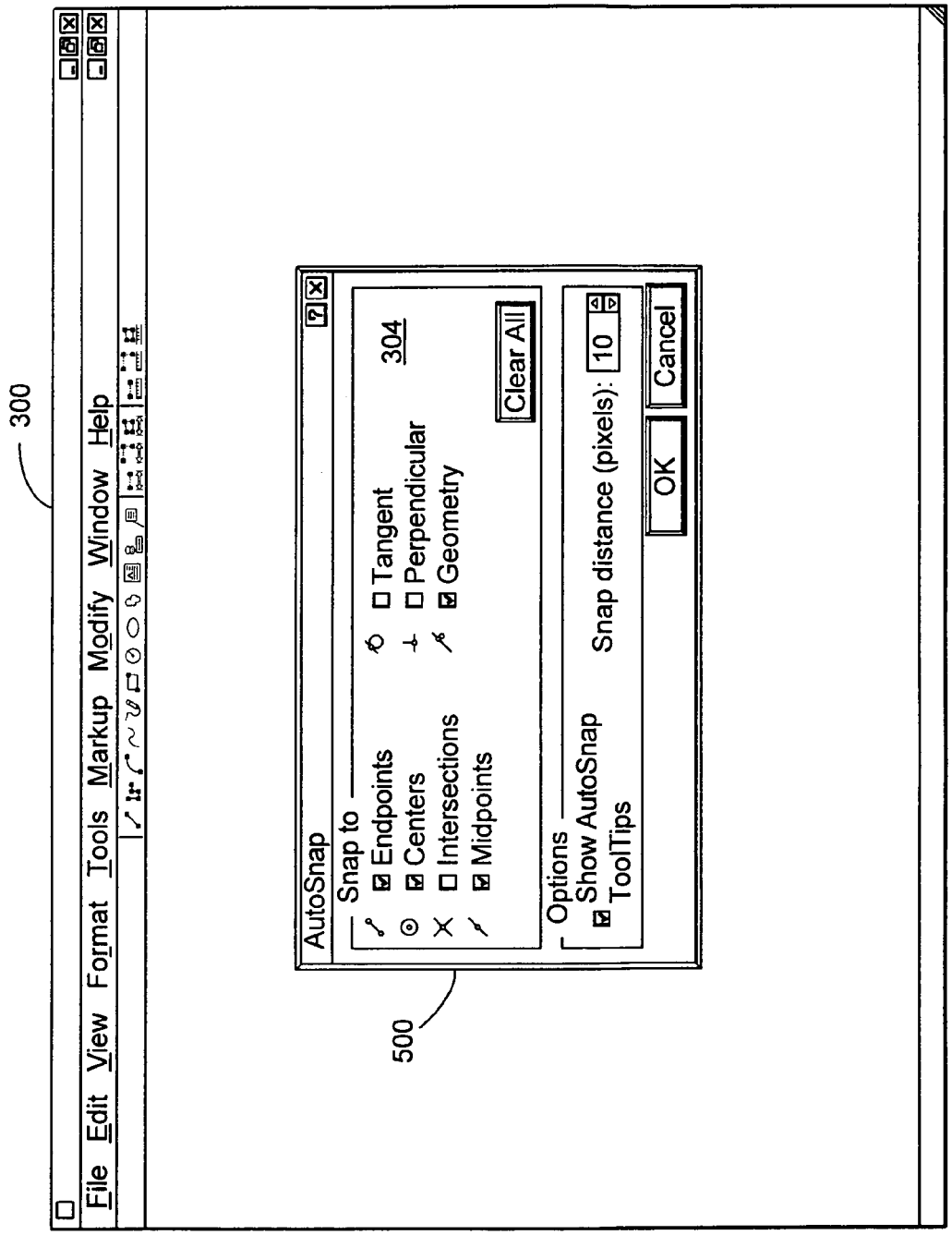

Referring to FIG. 5, AutoSnap 500 lets the user "snap" the cursor to precise points in a drawing. Snapping is a type of magnetism that pulls objects together, but it is temporary and for the purpose of positioning only. Objects that snap together do not stay together when the user moves one of them.

Snapping greatly enhances precision when drawing geometry and measuring. For example, "Endpoint" snap snaps the cursor to the endpoints of lines, while "Center" snap snaps it to the center of circles, arcs, ellipses, and rectangles. The user should always set snaps when the user is using the measuring tools.

If the user turns snaps on and off frequently, the user can display the AutoSnap toolbar (not shown), which has a button for each snap and a button to turn off all snaps. AutoSnap ToolTips (not shown) show the user which snaps are occurring in the drawing when several snaps are set. In this case, there is also a snap priority, determining which snap occurs when more than one type is possible. If a snap gets in the way, it can be turned off temporarily.

To control snaps:

1. On the Tools menu, select AutoSnap.
2. In the AutoSnap dialog box, select the snaps desired, so they are checked.
3. Use the Clear All AutoSnaps button to turn all snaps off. For example, if the user wants only one snap to operate, select Clear All AutoSnaps and then turn on the snap desired.
4. Turn AutoSnap ToolTips off if there is no need to see ToolTips in the drawing that indicate what snaps are enabled.
5. Set AutoSnap distance in pixels. This is the distance from the cursor to the snap target at which a snap will occur.
6. Select the OK button.

The snap priority is as follows:

1. Intersection.
2. Endpoint/Midpoint/Center/Quadrant.
3. Geometry.
4. Tangent/Perpendicular.

Figure 6:
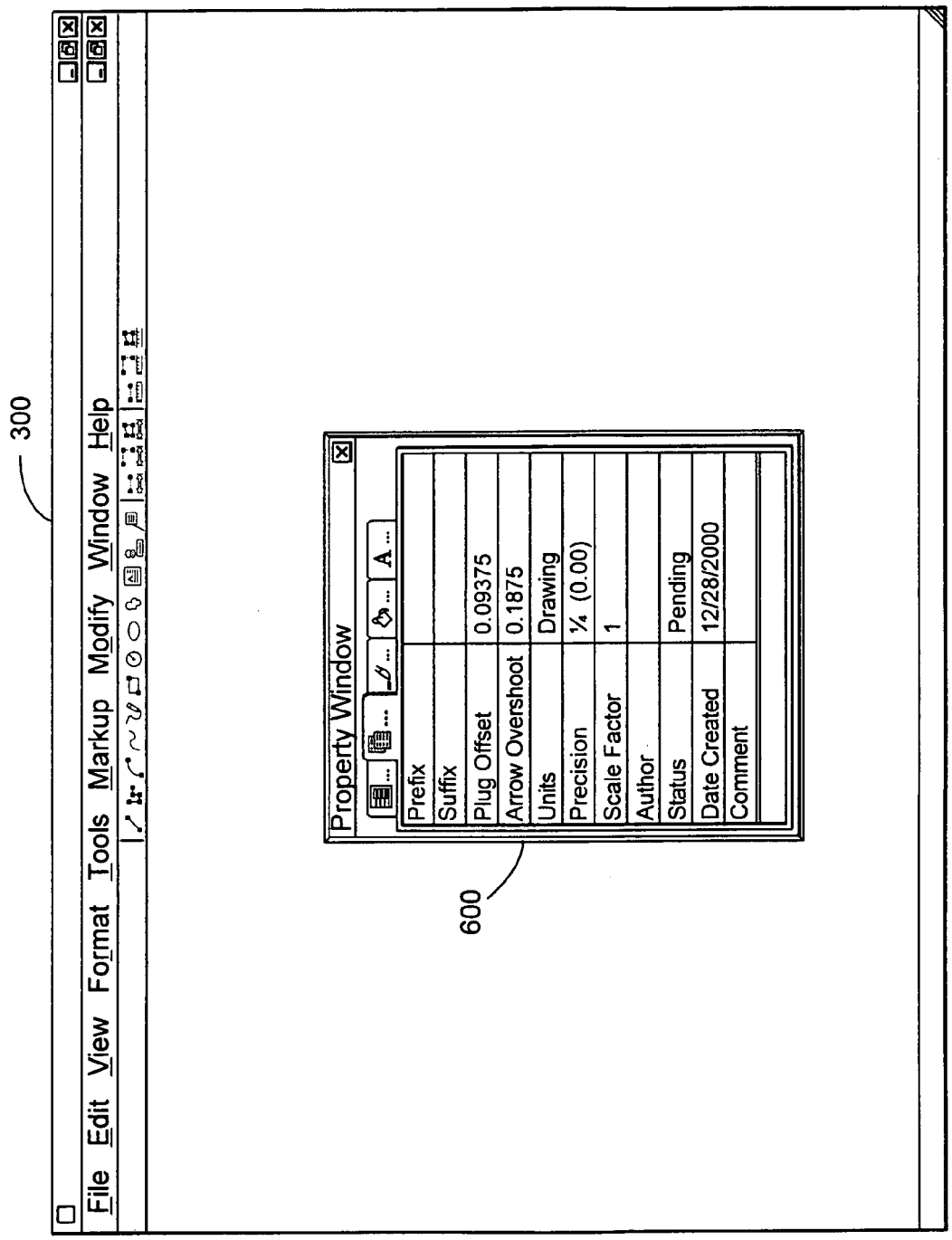

Referring to FIG. 6, Property Window 600 displays properties of the selected piece of geometry or text. The Property Window 600 is used for precision editing and formatting of objects. FIG. 6 shows the Extended Properties tab of the Property Window 600 for a Measure object 208. This tab illustrates the custom properties of the Measure object 208, including Prefix, Suffix, Plug Offset, Arrow Overshoot, Units, Precision, Scale Factor, Author, Status, Date Created, and Comment. These properties are described in more detail below.

Adding Dimension Measurements

Figure 7:
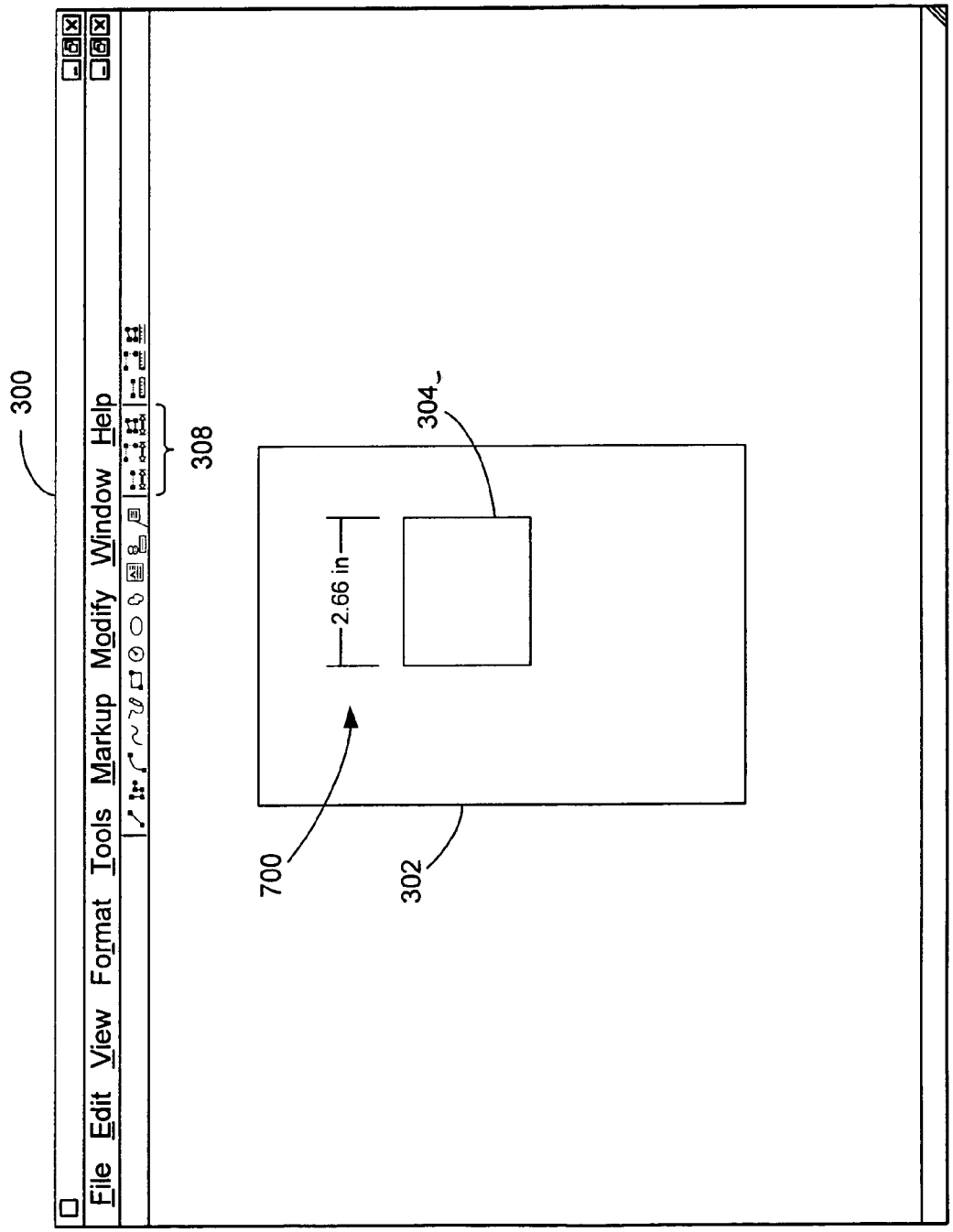
Figure 8:
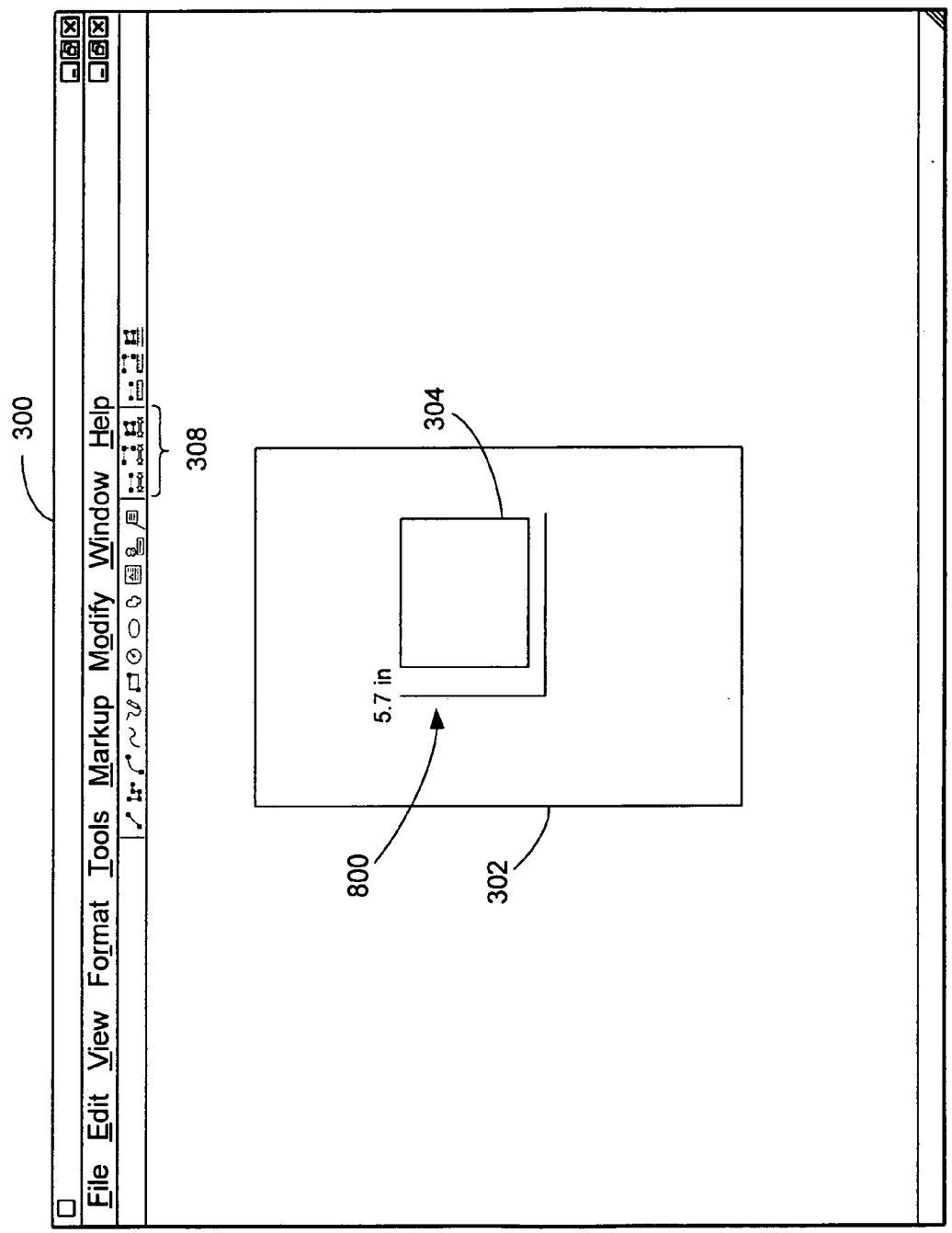
Figure 9:
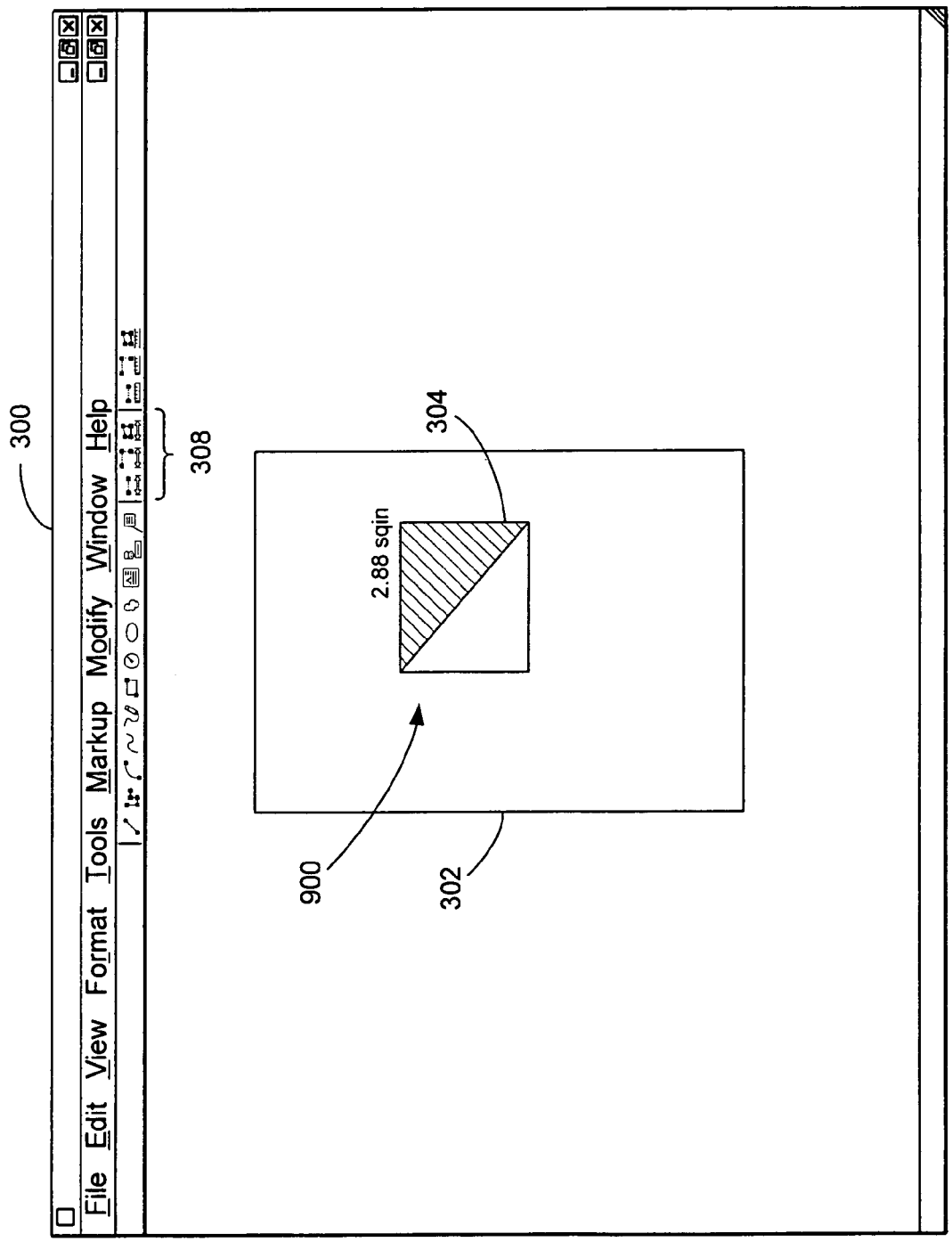

FIGS. 7, 8, and 9 illustrate dimension measurements according to the preferred embodiment of the present invention. Dimension measurements are used to measure lengths, areas, or point-to-point distances in a drawing.

FIG. 7 illustrates the "Markup Distance" object 700 according to the preferred embodiment of the present invention. To add this object 700, the following steps are performed:

1. On the toolbar 308, select the leftmost icon. Alternatively, on the Markup menu, select Distance.
2. Select the first point.
3. To help snap the definition points to existing points in the base drawing, select AutoSnap on the Tools menu and set snaps.
4. To constrain the distance orthogonally, hold down the SHIFT key.
5. Select the second point.

The measurement is displayed in current units of measurement.

FIG. 8 illustrates the "Markup Multi-Distance" object 800 according to the preferred embodiment of the present invention. To add this object 800, the following steps are performed:

1. On the toolbar 308, select the center icon. Alternatively, on the Markup menu, select Multi-distance.
2. Select the first definition point of the distance to measure.
3. To help snap the definition points to existing points in the base drawing, select AutoSnap on the Tools menu and set snaps.
4. To constrain the line segments defining the distance orthogonally, hold down the SHIFT key.
5. Select subsequent definition points of the distance.
6. Double-select to end the measurement.

The defined distance is displayed in current units of measurement.

FIG. 9 illustrates the "Markup Area" object 900 according to the preferred embodiment of the present invention. To add this object 900, the following steps are performed:

1. On the toolbar 308, select the rightmost icon. Alternatively, on the Markup menu, select Area.
2. Select the first definition point of the area to measure.
3. To help snap the definition points to existing points in the base drawing, select AutoSnap on the Tools menu and set snaps.
4. To constrain the line segments defining the area border orthogonally, hold down the SHIFT key.
5. Select subsequent definition points of the area.
6. Double-select to define the area.

The defined area is indicated visually (e.g., filled in with the cross-hatch pattern as shown in FIG. 9), and its area measurement is displayed in current units of measurement.

Editing Dimension Measurements

Dimension measurements are objects 208 that the user can reposition, resize, and format like any piece of markup geometry or text. Dimension measurements are also Active-Shapes, which means the user can edit them in a variety of ways using their extended properties and shortcut menu options.

Extended properties appear on the second tab of the Property Window. The following table lists the ways the user can edit dimension objects. Note that the extended properties and shortcut menu options for distance dimensions are different than those for multi-distance and area dimensions.

| Task | Distance dimensions | Multi-distance and area dimensions |
| --- | --- | --- |
| To add a prefix or suffix to dimension text | Select the dimension text and enter new text for the Prefix or Suffix property on the Extended Properties tab of the Property Window. Press Enter to apply the changes. | |
| To change the units of measurement | Select the dimension and change the value of the Units property on the Extended Properties tab of the Property Window. Press Enter to apply the changes. | |
| To change the unit precision | Select the dimension and enter a new value for the Precision property on the Extended Properties tab of the Property Window. Press Enter to apply the changes. The user can set up to eight decimal places of precision. | |
| To change the scale factor | Select the dimension and enter a new value for the Scale Factor property on the Extended Properties tab of the Property Window. Press Enter to apply the changes. | |
| To move dimension text above or below the dimension line | On the dimension's shortcut menu, select Text Above Line or Text Below Line. | |
| To move dimension text to the left or right of the dimension line | On the dimension's shortcut menu, select Right Aligned Text or Left Aligned Text. | On the dimension's shortcut menu, select Text at Left Side or Text at Right Side. |
| To make dimension text movable to anywhere in the drawing | On the dimension's shortcut menu, select Movable Text. | |
| To hide extension lines | On the dimension's shortcut menu, select Hide Left Extension or Hide Right Extension. | On the dimension's shortcut menu, select Hide Top Extension or Hide Bottom Extension. |

-continued

| Task | Distance dimensions | Multi-distance and area dimensions |
|---|---|---|
| To change the distance between the end of the extension line and the plug | Select the dimension and enter a new value for the Plug Offset property on the Extended Properties tab of the Property Window. Press Enter to apply the changes. | Not applicable. |
| To add or change dimension line arrows | Select the dimension and select an arrow for the Start Arrow and End Arrow property on the Line Properties tab of the Property Window. Press Enter to apply the changes. | Not applicable. |
| To change dimension line arrow size | Select the dimension and enter a new value for the Arrow Size properties on the Line Properties tab of the Property Window. Arrow size is proportional to line weight. Press Enter to apply the changes. | Not applicable. |
| To change the distance that the extension lines extend above the arrows on the dimension line | Select the dimension and enter a new value for the Arrow Overshoot property on the Extended Properties tab of the Property Window. Press Enter to apply the changes. | Not applicable. |

Taking Temporary Measurements

Figure 10:
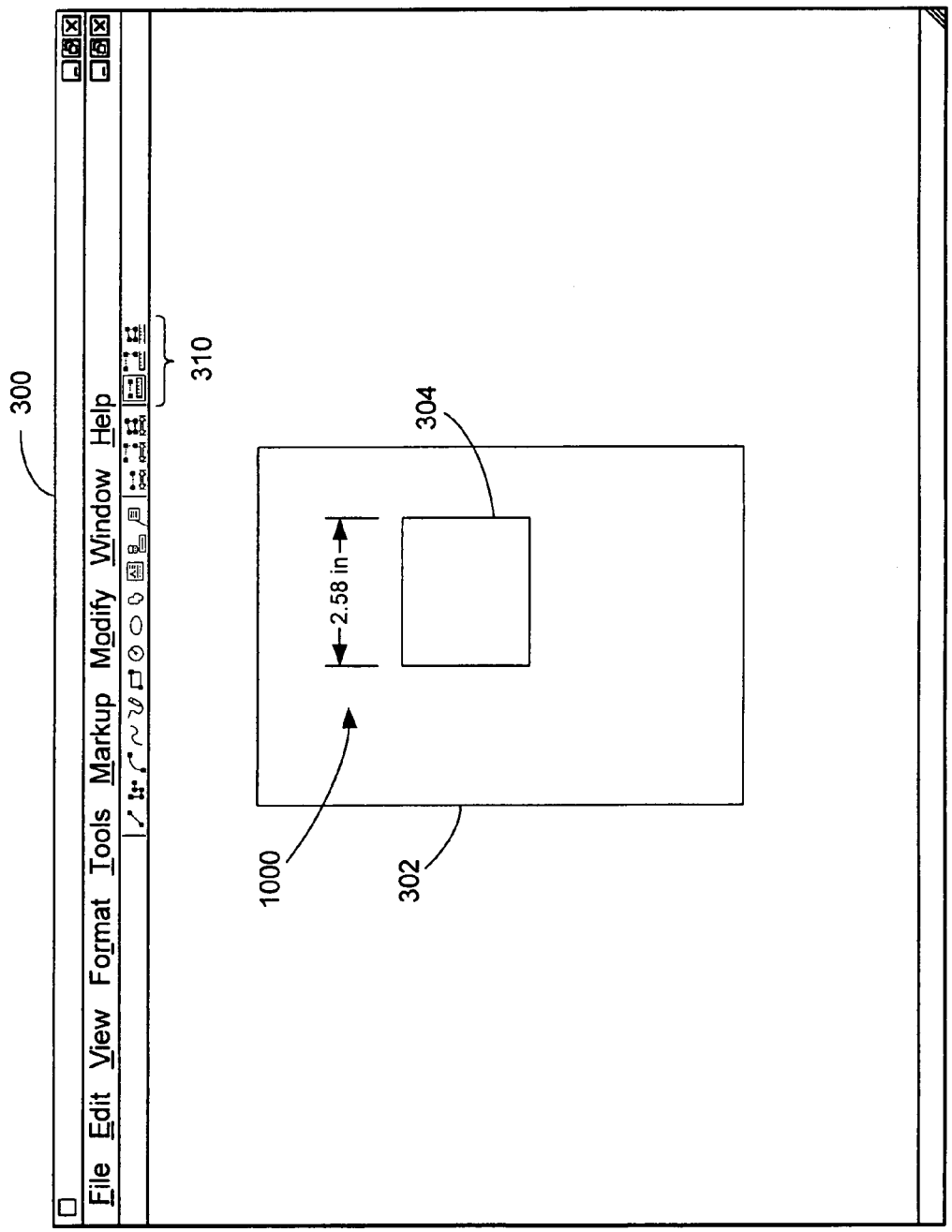
Figure 11:
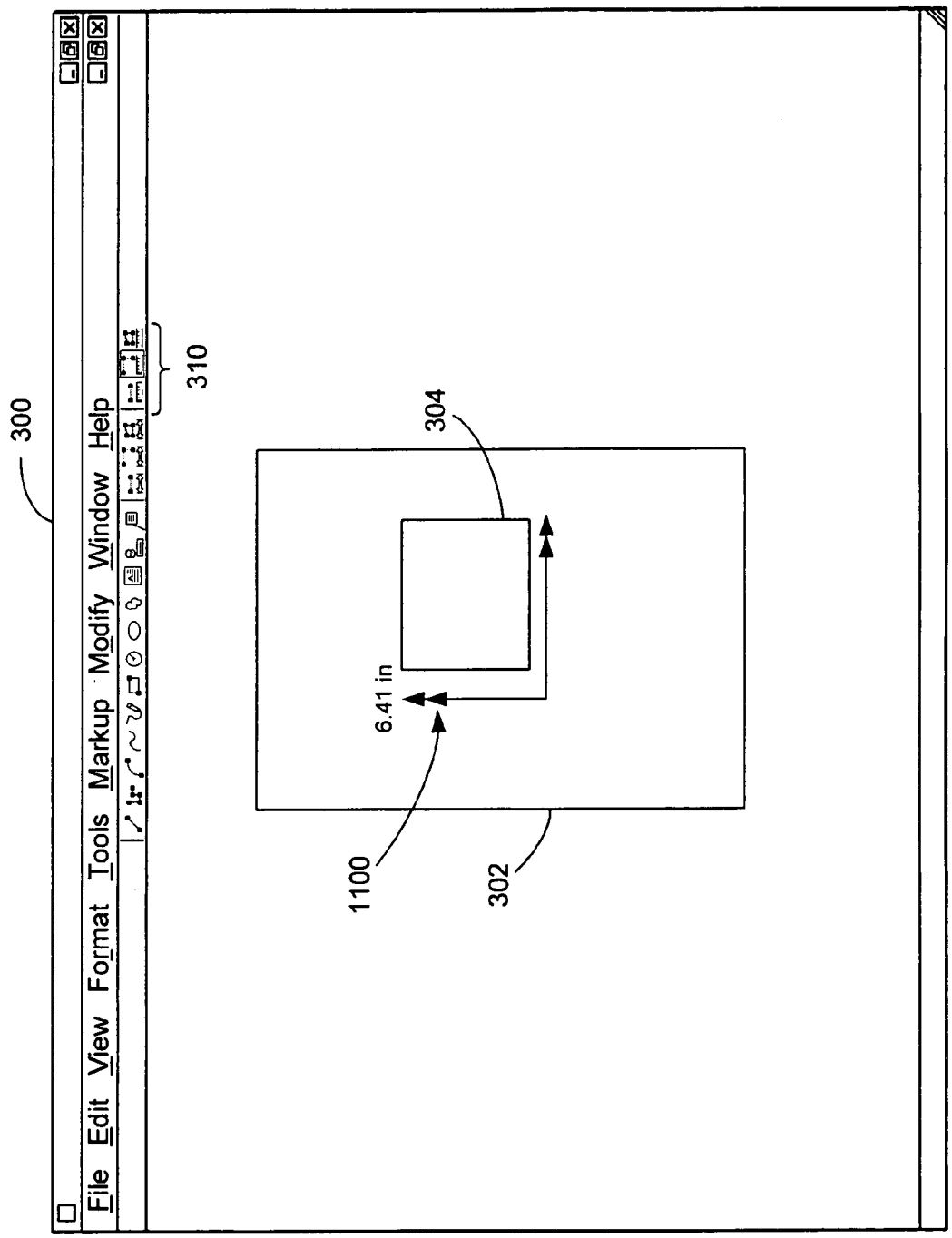
Figure 12:
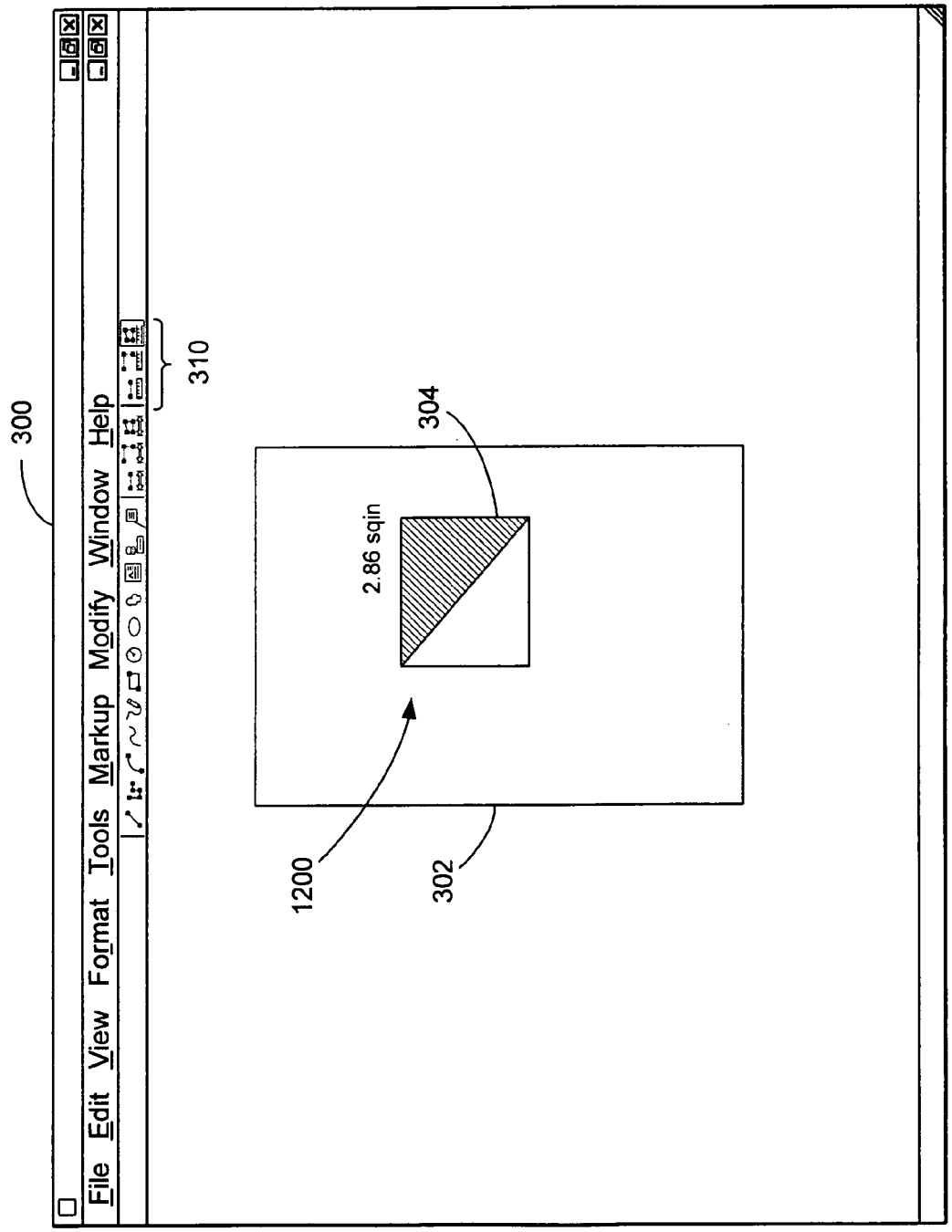

FIGS. 10, 11, and 12 illustrate temporary measurements according to the preferred embodiment of the present invention. Temporary measurements can help the user mark up a drawing 302 accurately. For example, the user might want to measure a door in a floor plan to verify that it is the correct size. The user can measure the distance between two points, the area enclosed by a polygon, or the combined distance of connected line segments. Temporary measurements snap to objects from the base drawing. However, temporary measurements are displayed only until the user make the next change to the drawing, and they are not saved with the drawing. The measurements are displayed in gray, using the current length units of measurement.

FIG. 10 illustrates the "Measure Distance" object 1000 according to the preferred embodiment of the present invention. To add this object 1000, the following steps are performed:

1. On the toolbar 310, select the leftmost icon. Alternatively, on the Tools menu, select the Distance item.
2. Select the first point.
3. To help snap the definition points to existing points in the base drawing, select AutoSnap on the Tools menu and set snaps.
4. To constrain the distance orthogonally, hold down the SHIFT key.
5. Select the second point.
6. The measurement is displayed in current units of measurement.

FIG. 11 illustrates the "Measure Multi-Distance" object 1100 according to the preferred embodiment of the present invention. To add this object 1100, the following steps are performed:

1. On the toolbar 310, select the center icon. Alternatively, on the Tools menu, select Multi-distance.
2. Select the first definition point of the distance to measure.
3. To help snap the definition points to existing points in the base drawing, select AutoSnap on the Tools menu and set snaps.
4. To constrain the line segments defining the distance orthogonally, hold down the SHIFT key.
5. Select subsequent definition points of the distance.
6. Double-select to end the measurement.

The defined distance is displayed in current units of measurement.

FIG. 12 illustrates the "Measure Area" object 1200 according to the preferred embodiment of the present invention. To add this object 1200, the following steps are performed:

1. On the toolbar 310, select the rightmost icon. Alternatively, on the Tools menu, select Area.
2. Select the first definition point of the area to measure.
3. To help snap the definition points to existing points in the base drawing, select AutoSnap on the Tools menu and set snaps.
4. To constrain the line segments defining the area border orthogonally, hold down the SHIFT key.
5. Select subsequent definition points of the area.
6. Double-select to define the area.

The defined area is visually indicated (e.g., filled in with gray as shown in FIG. 12), and its area measurement is displayed in current units of measurement.

Setting Units for Measurements

There are two ways to set the units for the user's measurements in a markup drawing:

Use the default units of the base drawing.

Set specific units for the markup drawing in the Options dialog box.

The user can also set the precision with which measurement units are displayed. Display precision defines only the display, and not the precision with which units are stored.

To set specific measurement units:
1. On the Format menu, select Units.
2. On the Units tab of the Drawing Settings dialog box, set Drawing units to determine measurement units in the markup drawing.
3. Set font size and line weight units to determine measurement units for text in the markup drawing.
4. Select OK.

To set the precision of measurement unit display:
1. On the Options menu, select Tools.
2. On the View tab of the Options dialog box, select a decimal precision for all units except feet and inches.
3. Select a fractional precision for feet and inches.
4. Select OK.

Note that, if a measurement object is selected, and then the units are changed using the Property Window's Units item, a conversion of the measurement value takes place. This allows, for example, a reviewer to use metric system to measure a drawing made with non-metric values.

Logic of the Preferred Embodiment

Figure 13:
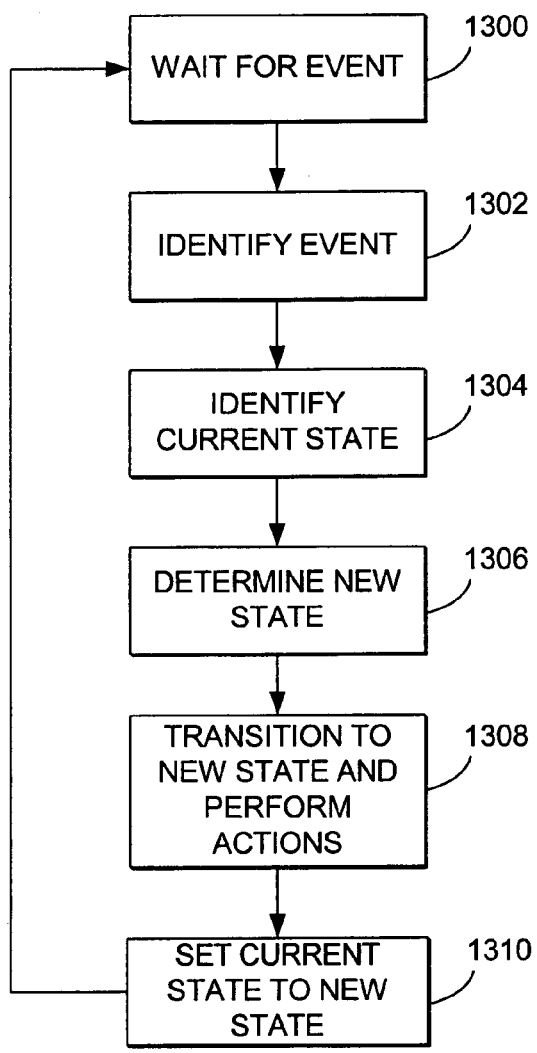
FIG. 13 is a flowchart that illustrates the general logic of a message or event-driven drawing tool performing the steps of the present invention.
Figure 14:
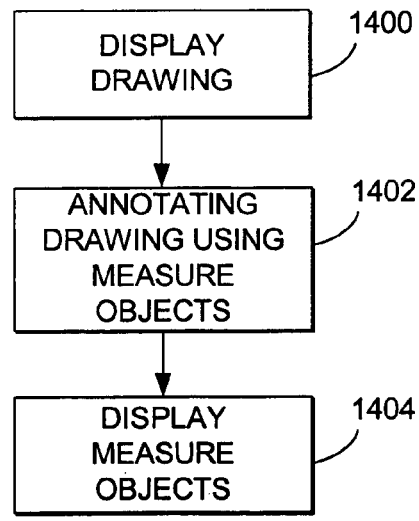
FIG. 14 is a flowchart that illustrates the general logic that is performed in the drawing tool when using the Measure objects, according to the preferred embodiment of the present invention.

Flowcharts which illustrate the logic of the Measure objects according to the preferred embodiment of the present invention are shown in FIGS. 13 and 14. Those skilled in the art will recognize that this logic is provided for illustrative purposes only and that different logic may be used to accomplish the same results.

In the preferred embodiment, the various operations described below are specifically related to the Volo View product. Of course, those skilled in the art will recognize that the use of the Measure objects with different drawing tools 108 may result in the different operations (or potentially the same operations).

FIG. 13 is a flowchart that illustrates the general logic of a message or event-driven drawing tool 108 performing the steps, according to the preferred embodiment of the present invention. In such a drawing tool 108, operations are performed when transitions are made, based upon the receipt of messages or events, from present or current states to new states.

Generally, the flowchart begins by waiting at block 1300 for an event (e.g., a mouse button click). It should be appreciated that during this time, other operating system tasks, e.g., file, memory, and video tasks, etc., may also be carried out. When an event occurs, control passes to block 1302 to identify the event. Based upon the event, as well as the current state of the system determined in block 1304, a new state is determined in block 1306. In block 1308, the logic transitions to the new state and performs any actions required for the transition. In block 1310, the current state is set to the previously determined new state, and control returns to block 1300 to wait for more input events.

The specific operations that are performed by block 1308 when transitioning between states will vary depending upon the current state and the event. The various operations required to implement the drawing tool 108 represent particular events handled by the logic. However, it should be appreciated that these operations represent merely a subset of all of the events handled by the drawing tool 108.

FIG. 14 is a flowchart that illustrates the general logic that is performed in the drawing tool 108 when using the Measure objects 208, according to the preferred embodiment of the present invention.

Block 1400 represents the drawing tool 108 displaying a drawing 302 on a monitor of a computer 104, wherein the drawing 302 includes one or more objects 304.

Block 1402 represents the drawing tool 108 annotating the drawing 302 using a Measure object 208 in the drawing 302, wherein the Measure objects 208 may comprise dimension measurements and temporary measurements. In the preferred embodiment, dimension measurements may comprise a Markup Distance object, Markup Multi-Distance object, and Markup Area object, while temporary measurements may comprise a Measure Distance object, Measure Multi-Distance object, and Measure Area object. In this Block, the Measure object 208 is placed proximate to one of the objects 304 in the drawing 302 (and may snap to the object 304), and then queries the object 304 for one or more measurement values stored therein. The placement of the Measure objects 208 can be facilitated by precision markup tools including Rulers (which show measurements based on a current units and drawing scale to help a user make exact measurements), AutoSnaps (which make a cursor snap to one or more precise points on an object), and Property Windows (which provide for precision editing and formatting of the measure objects). The measurement values may comprise, inter alia, distances, multi-distances, areas, etc.

Block 1404 represents the drawing tool 108 displaying the Measure object 208 with the drawing 302 and its objects 304 on the monitor of the computer 104, wherein the Measure object 208 displays the measurement values queried from the object 304.

Conclusion

This concludes the description of one or more embodiments of the invention. The following describes some alternative embodiments for accomplishing the present invention.

For example, any type of computer, such as a mainframe, minicomputer, work station or personal computer, could be used with the present invention. In addition, any program, function, or operating system that creates or utilizes measurements of graphic images could benefit from the present invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for annotating a drawing, comprising:
   (a) displaying a drawing on a monitor of a computer, wherein the drawing includes one or more objects;
   (b) annotating the drawing using a measure object in the drawing, wherein the measure object is placed proximate to one of the objects in the drawing and then queries the object for one or more measurement values stored therein; and
   (c) displaying the measure object on the monitor of the computer, wherein the measure object displays the measurement values from the queried object.

2. The method of claim 1, wherein the measurement values are selected from a group comprising distances, multi-distances and areas.

3. The method of claim 1, wherein the measure objects can snap to other objects.

4. The method of claim 1, wherein the measure objects are selected from a group of dimension measurements comprising a Markup Distance object, Markup Multi-Distance object, and Markup Area object.

5. The method of claim 1, wherein the measure objects are selected from a group of temporary measurements comprising a Measure Distance object, Measure Multi-Distance object, and Measure Area object.

6. The method of claim 1, further comprising using precision markup tools to annotate the drawing with precision.

7. The method of claim 6, wherein the precision markup tools are selected from a group comprising a Ruler, AutoSnap, and Property Window.

8. The method of claim 7, wherein the Ruler shows measurements based on a current units and drawing scale to help a user make exact measurements.

9. The method of claim 7, wherein the AutoSnap makes a cursor snap to one or more precise points on an object.

10. The method of claim 7, wherein the Property Window provides for precision editing and formatting of the measure objects.

11. A computer-implemented system for annotating a drawing, comprising:
 (a) a computer;
 (b) means, performed by the computer, for displaying a drawing on a monitor of a computer, wherein the drawing includes one or more objects;
 (c) means, performed by the computer, for annotating the drawing using a measure object in the drawing, wherein the measure abject is placed proximate to one of the objects in the drawing and then queries the object for one or more measurement values stored therein; and
 (d) means, performed by the computer, for displaying the measure object on the monitor of the computer, wherein the measure object displays the measurement values from the queried object.

12. The system of claim 11, wherein the measurement values are selected from a group comprising distances, multi-distances and areas.

13. The system of claim 11, wherein the measure objects can snap to other objects.

14. The system of claim 11, wherein the measure objects are selected from a group of dimension measurements comprising a Markup Distance object, Markup Multi-Distance object, and Markup Area object.

15. The system of claim 11, wherein the measure objects are selected from a group of temporary measurements comprising a Measure Distance object, Measure Multi-Distance object, and Measure Area object.

16. The system of claim 11, further comprising using precision markup tools to annotate the drawing with precision.

17. The system of claim 16, wherein the precision markup tools are selected from a group comprising a Ruler, AutoSnap, and Property Window.

18. The system of claim 17, wherein the Ruler shows measurements based on a current units and drawing scale to help a user make exact measurements.

19. The system of claim 17, wherein the AutoSnap makes a cursor snap to one or more precise points on an object.

20. The system of claim 17, wherein the Property Window provides for precision editing and formatting of the measure objects.

21. An article of manufacture embodying logic for annotating a drawing, the logic comprising:
 (a) displaying a drawing on a monitor of a computer, wherein the drawing includes one or more objects;
 (b) annotating the drawing using a measure object in the drawing, wherein the measure object is placed proximate to one of the objects in the drawing and then queries the object for one or more measurement values stored therein; and
 (c) displaying the measure object on the monitor of the computer, wherein the measure object displays the measurement values from the queried object.

22. The article of manufacture of claim 21, wherein the measurement values are selected from a group comprising distances, multi-distances and areas.

23. The article of manufacture of claim 21, wherein the measure objects can snap to other objects.

24. The ankle of manufacture of claim 21, wherein the measure objects are selected from a group of dimension measurements comprising a Markup Distance object, Markup Multi-Distance object, and Markup Area object.

25. The article of manufacture of claim 21, wherein the measure objects are selected front a group of temporary measurements comprising a Measure Distance object, Measure Multi-Distance object, and Measure Area object.

26. The article of manufacture of claim 21, further comprising using precision markup tools to annotate the drawing with precision.

27. The article of manufacture of claim 26, wherein the precision markup tools are selected from a group comprising a Ruler, AutoSnap, and Property Window.

28. The article of manufacture of claim 27, wherein the Ruler shows measurements based on a current units and drawing scale to help a user make exact measurements.

29. The article of manufacture of claim 27, wherein the AutoSnap makes a cursor snap to one or more precise points on an object.

30. The article of manufacture of claim 27, wherein the Property Window provides for precision editing and formatting of the measure objects.

31. A data structure stored in a memory of a computer, wherein the data structure contains an annotated drawing and the annotated drawing includes one or more objects, wherein the annotated drawing includes one or more measure object that annotate the drawing, the measure object being placed proximate to one of the objects in the drawing to query the object for one or more measurement values stored therein, and the measure object displaying the measurement values from the queried object when the annotated drawing is displayed on a monitor attached to the computer.

32. The data structure of claim 31, wherein the measurement values are selected from a group comprising distances, multi-distances and areas.

33. The data structure of claim 31, wherein the measure objects can snap to other objects.

34. The data structure of claim 31, wherein the measure objects are selected from a group of dimension measurements comprising a Markup Distance object, Markup Multi-Distance object, and Markup Area object.

35. The data structure of claim 31, wherein the measure objects are selected from a group of temporary measurements comprising a Measure Distance object, Measure Multi-Distance object, and Measure Area object.

36. The data structure of claim 31, further comprising using precision markup tools to annotate the drawing with precision.

37. The data structure of claim 36, wherein the precision markup tools are selected front a group comprising a Ruler, AutoSnap, and Property Window.

38. The data structure of claim 37, wherein the Ruler shows measurements based on a current units and drawing scale to help a user make exact measurements.

39. The data structure of claim 37, wherein the AutoSnap makes a cursor snap to one or more precise points on an object.

40. The data structure of claim 37, wherein the Property Window provides for precision editing and formatting of the measure objects.

* * * * *

UNITED STATES PATENT AND TRADEMARK OFFICE
CERTIFICATE OF CORRECTION

PATENT NO. : 6,992,685 B2
APPLICATION NO. : 09/792602
DATED : January 31, 2006
INVENTOR(S) : Damian M. Hallbauer et al.

It is certified that error appears in the above-identified patent and that said Letters Patent is hereby corrected as shown below:

Column 13, line 25, for claim 11, "abject" should read --object--.
Column 14, line 6, for claim 24, "ankle" should read --article--.
Column 14, line 10, for claim 25, "front" should read --from--.
Column 14, line 55, for claim 37, "front" should read --from--.

Signed and Sealed this

Nineteenth Day of September, 2006

JON W. DUDAS
*Director of the United States Patent and Trademark Office*